United States Patent

Hanrahan et al.

[11] Patent Number: 5,973,885
[45] Date of Patent: Oct. 26, 1999

[54] SWAGEABLE BASE FOR SUSPENSION ASSEMBLY IN HARD DISK DRIVE WITHOUT FLANGE

[75] Inventors: Kevin Hanrahan; Ryan Schmidt, both of Santa Barbara, Calif.

[73] Assignee: Intr-Plex Technologies, Inc., Golea, Calif.

[21] Appl. No.: 08/931,803

[22] Filed: Sep. 16, 1997

[51] Int. Cl.⁶ .................................................. G11B 5/48
[52] U.S. Cl. ............................................................ 360/104
[58] Field of Search .................................... 360/104–106

[56] References Cited

U.S. PATENT DOCUMENTS 5,715,117  2/1998  Brooks ..................................... 360/104

*Primary Examiner*—Allen T. Cao
*Attorney, Agent, or Firm*—Owen L. Lamb

[57] ABSTRACT

A disk head suspension assembly in which a swage ring (a cylindrical hub) is used for attaching a load beam to a head actuator arm. The swage ring is used instead of a typical base plate. A head suspension assembly includes a cylindrical hub having an inner diameter and an outer diameter and a load beam having a load beam hole therein. The load beam hole has a diameter that is less than the outer diameter of the swage ring and greater than the inner diameter of the swage ring. The swage ring is placed concentric with the load beam hole and a series of welds around a periphery of the load beam hole are made so that the welds affix the swage ring to the load beam. The swage ring is inserted into an actuator arm boss hole and the swage ring is swaged outward to create a press fit upon the actuator boss hole.

8 Claims, 1 Drawing Sheet

SWAGEABLE BASE FOR SUSPENSION ASSEMBLY IN HARD DISK DRIVE WITHOUT FLANGE

BACKGROUND OF THE INVENTION

1. Field of the Invention

This invention relates to disk head assemblies for supporting read/write heads adjacent rotating disks in disk drives and more particularly, to a swage ring for attaching a load beam assembly to a head actuator arm.

2. Description of the Prior Art

Disk drives typically include a stack of spaced apart, concentric magnetic storage disks mounted on a common shaft, and an actuator arm assembly encased within a housing. The actuator arm assembly, also called a head stack assembly (HSA), comprises a plurality of arms extending into spacing between the disks. Mounted on the distal end of each arm is a resilient suspension assembly to which is attached an air bearing slider, the combination of which is referred to as a head gimbal assembly (HGA). Included in the suspension assembly is a load beam, which is mounted at one end to the actuator arm by means of a base plate, and a flexure which is attached to the other end of the load beam and pivotally supports the slider on a gimbal that keeps the slider suspended in a horizontal plane on the disk surface regardless of any motion of the load beam.

The load beam provides the resilient spring action that biases the slider toward the surface of a magnetic recording disk, while the flexure provides flexibility for the slider. A thin film or other magnetic transducer is deposited or otherwise attached at the rearward end of the slider to read or write on the magnetic disk.

In the prior art, the actuator arm and load beam elements of the head stack assembly are connected end to end by a base plate which includes a flat flange portion and a cylindrical hub portion or boss. In assembling the head stack, the hub is inserted into a load beam boss hole and the flange portion is welded to the load beam. The hub is then inserted into an actuator arm boss hole.

Using a swage machine, a swage ball is driven through the hub. The swage ball exerts pressure on the hub which expands (swages) into the boss hole in the actuator arm. The expanded hub rigidly connects the hub and attached load beam to the actuator arm boss hole. The expanded hub creates a very tight friction fit against the sides of the boss hole. To ensure a tight fit, the length of the hub is such that sufficient contact exists between the outer portion of the hub and the inner portion of the boss hole. As the hub plastically deforms, it hardens, which is desirable for maintaining a press fit in the actuator arm boss hole.

Because the load beam is welded to the flange portion of the base plate and the flange is soft from annealing, the flange deforms easily, resulting in fluctuations in the load beam that is welded to the flange. As the disk drive industry moves to nano and pico form factors, the thickness of the base plate becomes a more significant factor in the overall stack height of the head stack assembly.

It is therefore an object of this invention is to provide a new base plate which will result in a lower stack height of a head suspension assembly.

SUMMARY OF THE INVENTION

The invention is a base plate in which a flange portion is completely eliminated. A load beam is welded directly to the top side of the a swage ring (a cylindrical hub) and the load beam serves as a clamp medium.

An advantage of this invention is that by welding a load beam directly on top of a swage ring, the stacking height of a Head Gimbal Assembly (HGA) portions of a head stack assembly is reduced.

A further advantage of this invention is that because the load beam material is much harder than a base plate material and much less prone to plastic deformation, the invention decreases the susceptibility of a load beam to plastic deformation during a swaging operation.

A further advantage of this invention is the loss of approximately 0.025 inch of a 0.006 inch thick, 0.200 inch square base plate.

BRIEF DESCRIPTION OF THE DRAWINGS

The invention will be described in greater detail with reference to the drawings in which.

In these figures, similar numerals refer to similar elements in the drawing. It should be understood that the sizes of the different components in the figures may not be to scale, or in exact proportion, and are shown for visual clarity and for the purpose of explanation.

DETAILED DESCRIPTION OF THE INVENTION

Figure 1:
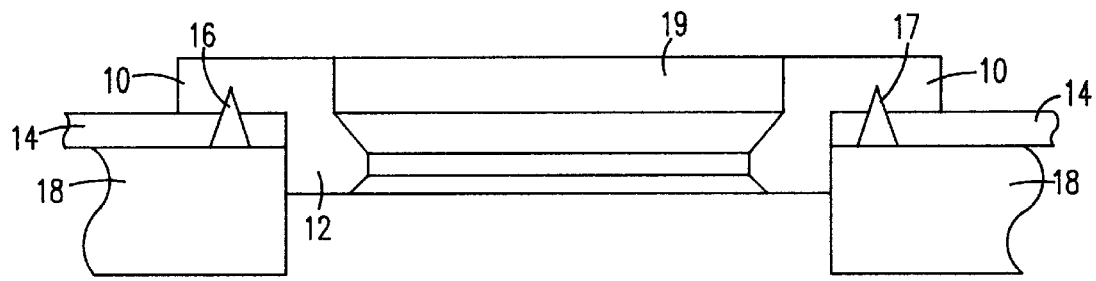
FIG. 1 is side view of a base plate of the prior art.

FIG. 1 is side view of a base plate of the prior art. An actuator arm and load beam, which are elements of an head stack assembly, are connected end to end by the base plate. The base plate includes a flat flange portion 10 and a cylindrical hub portion or boss 12. In assembling the suspension assembly, the hub 12 is inserted through a load beam boss hole in a load beam 14 and the flange portion 10 is welded 16, 17 to the load beam 14. The hub 12 is then inserted through an actuator arm boss hole in the actuator arm 18. A swage ball is passed through the center 19 of the hub 12 causing pressure to be applied to cause the hub 12 to expand into the boss hole in the actuator arm, rigidly connecting the hub and attached load beam to the actuator arm boss hole.

Figure 2:
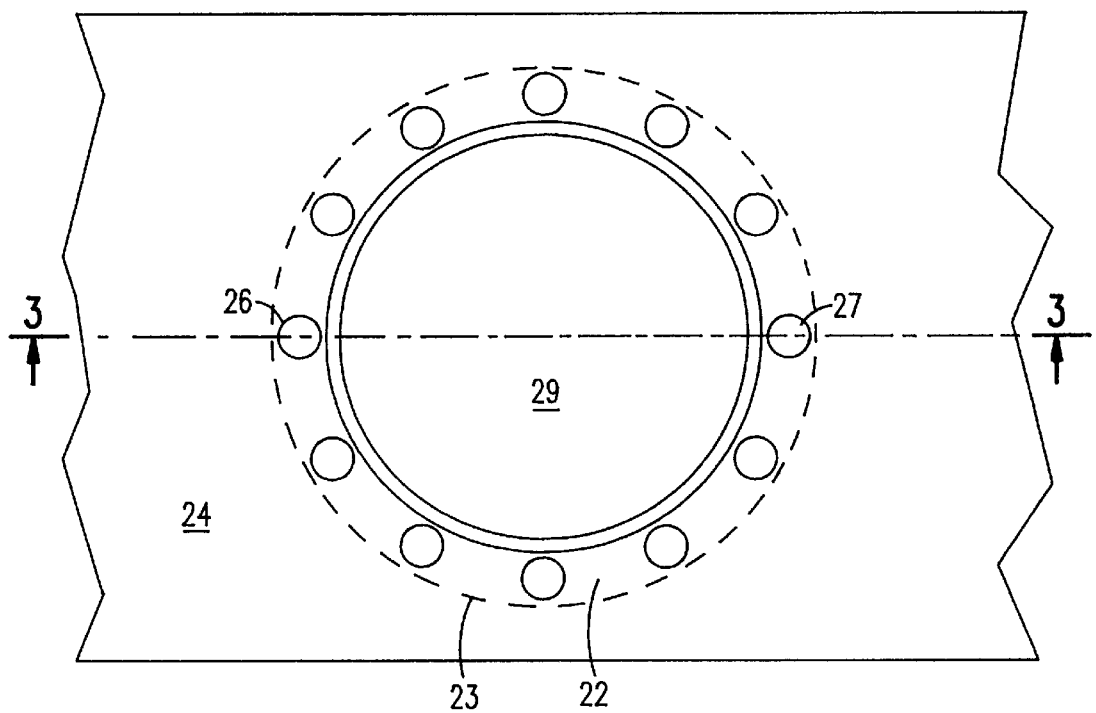
FIG. 2 is a top view of a base in accordance with the present invention.
Figure 3:
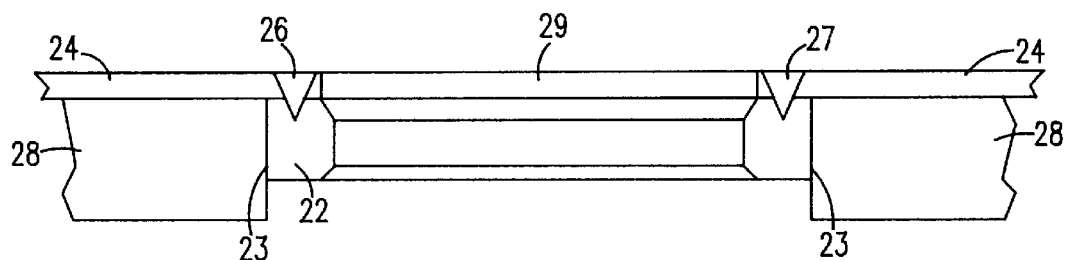
FIG. 3 is side view of the structure of FIG. 2 taken along the view line 3—3.

The invention will be described with reference to FIG. 2 which is a top view of a swage ring (a cylindrical hub) in accordance with the present invention and FIG. 3 which is side view of the structure of FIG. 2 taken along the view line 3—3. A cylindrical hub 22 is fabricated with a given outer diameter (OD) and an inner diameter (ID) of such dimension as to accommodate a swage ball for swaging in a manner well known in the prior art. A load beam 24 has a hole punched therein which has a diameter that is less that the OD dimension and greater than the ID dimension so as to not interfere with the swage ball operation. The hub 22 is placed concentric with the load beam hole and a series of welds 26, 27, etc. around a periphery of the load beam hole are made so that the welds affix the hub to the load beam. In assembling the load beam 24 and the actuator arm 28, the hub 22 is inserted through an actuator arm boss hole 23 in the actuator arm 28. A swage ball is passed through the center 29 of the hub 22 causing pressure to be applied to cause the hub 22 to expand into the boss hole 23 in the actuator arm, rigidly connecting the hub and attached load beam to the actuator arm boss hole.

METHOD OF MANUFACTURE

A method of manufacturing a head suspension assembly in accordance with the invention is as follows. A cylindrical hub having an inner diameter and an outer diameter is fabricated. A load beam is stamped out of sheet metal and a load beam hole that has a load beam hole diameter that is less than the outer diameter of the hub is formed therein. The load beam hole should have a diameter that is greater than the inner diameter of the hub in order to allow passage of a swaging ball. The hub is placed concentrically with the load beam hole. The hub is affixed to the load beam by a suitable means such as by producing a series of welds around the periphery of the load beam hole such that the welds go through the load beam and into the hub.

An actuator arm is fabricated with an actuator arm boss hole having a boss hole diameter that is substantially the same as the outer diameter of the hub. The hub is inserted into the actuator arm boss hole and the hub is swaged to the actuator arm boss hole by passing a swage ball through the hub.

While the invention has been particularly shown and described with reference to preferred embodiments thereof, it will be understood by those skilled in the art that the foregoing and other changes in form and detail may be made therein without departing from the scope of the invention.

What is claimed is:

1. A head suspension assembly comprising:
   a cylindrical hub having an inner diameter and an outer diameter;
   a load beam having a load beam hole therein;
   said load beam hole having a load beam hole diameter that is less than said outer diameter;
   said hub being concentric with said load beam hole; and,
   a series of welds around a periphery of said load beam hole;
   said welds affixing said hub to said load beam.

2. The head suspension assembly of claim 1 wherein said load beam hole has a diameter that is less than said outer diameter and greater than said inner diameter.

3. The head suspension assembly of claim 1 further comprising
   an actuator arm having an actuator arm boss hole therein;
   said hub being in said actuator arm boss hole and swaged thereto.

4. The head suspension assembly of claim 2 further comprising
   an actuator arm having an actuator arm boss hole therein;
   said hub being in said actuator arm boss hole and swaged thereto.

5. A method of manufacturing a head suspension assembly comprising:
   A. fabricating a cylindrical hub having an inner diameter and an outer diameter;
   B. forming, in a load beam, a load beam hole that has a load beam hole diameter that is less than said outer diameter;
   C. placing said hub concentrically with said load beam hole; and,
   D. producing a series of welds around a periphery of said load beam hole, said welds being such as to affix said hub to said load beam.

6. The method of claim 5 wherein said load beam hole has a diameter that is less than said outer diameter and greater than said inner diameter.

7. The method of claim 5 further comprising steps of:
   E. forming, in an actuator arm, an actuator arm boss hole having a boss hole diameter that is substantially the same as said outer diameter;
   F. inserting said hub into said actuator arm boss hole; and,
   G. swaging said hub to said actuator arm boss hole.

8. The method of claim 6 further comprising steps of:
   E. forming, in an actuator arm, an actuator arm boss hole having a boss hole diameter that is substantially the same as said outer diameter;
   F. inserting said hub into said actuator arm boss hole; and,
   G. swaging said hub to said actuator arm boss hole.

* * * * *